Sept. 17, 1940.          S. DE W. REED          2,215,232
                ROTARY INTERNAL COMBUSTION ENGINE
              Filed Aug. 31, 1938      3 Sheets-Sheet 1
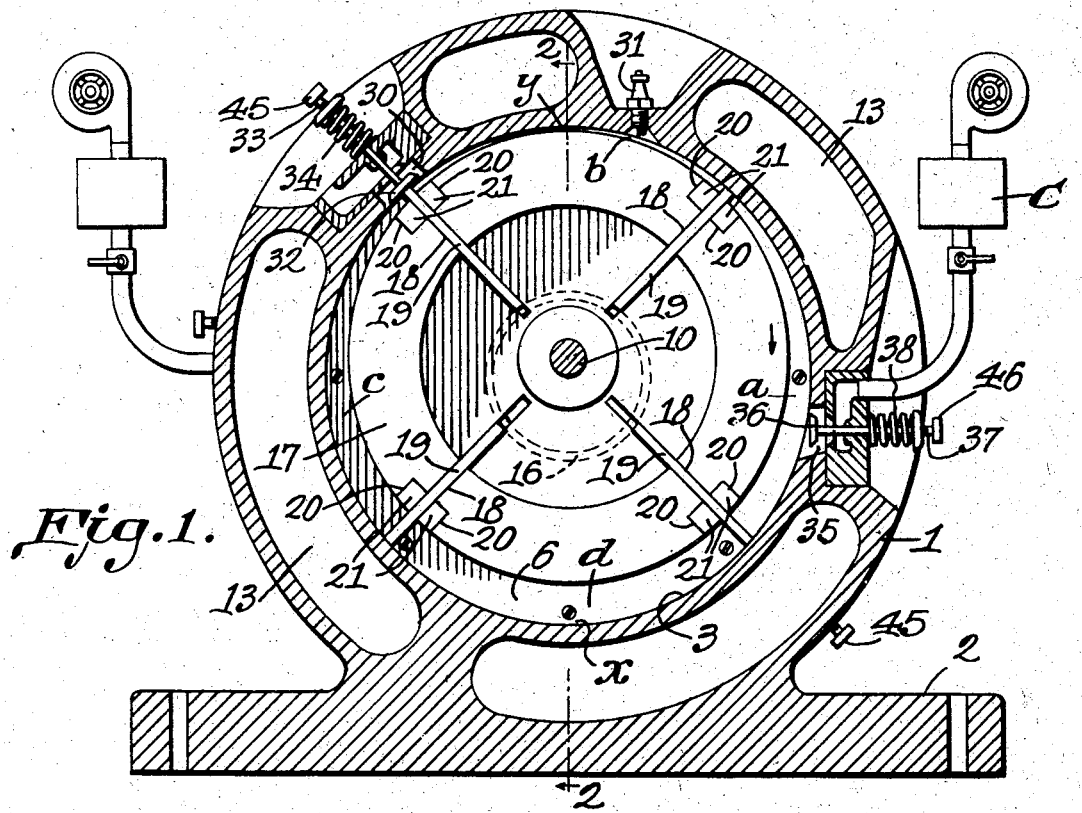
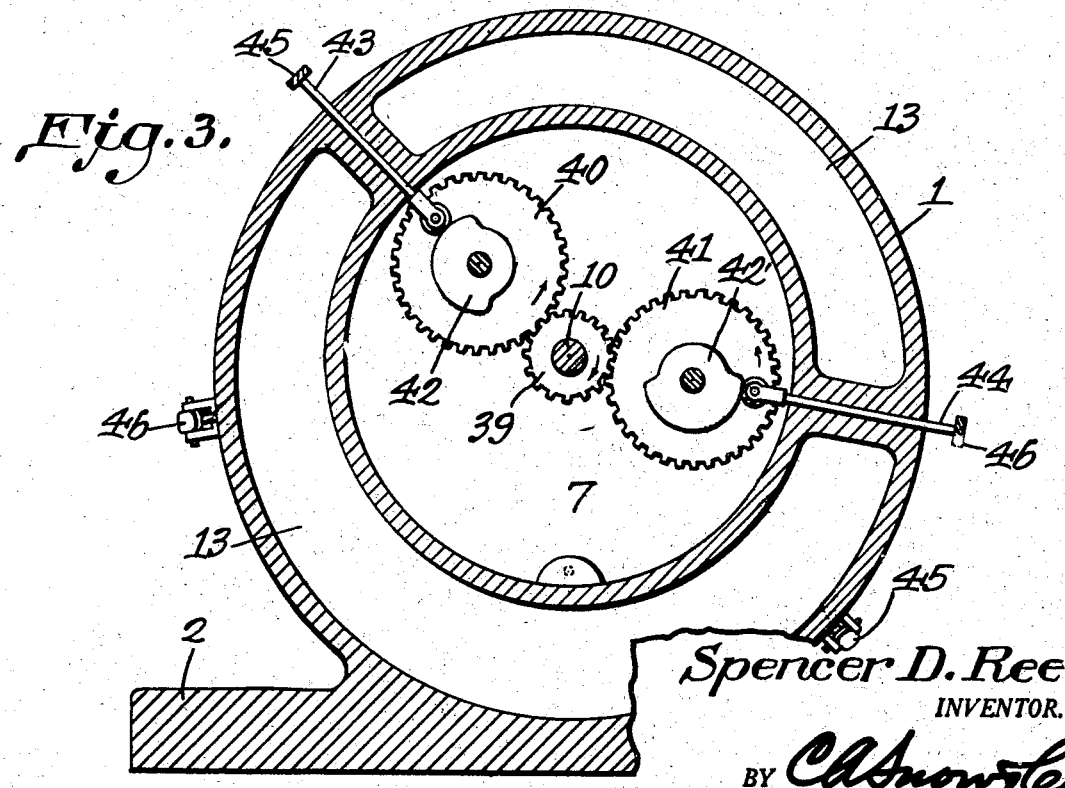
Spencer D. Reed
INVENTOR.
BY Ch Snowles
ATTORNEYS.

Sept. 17, 1940.  S. DE W. REED  2,215,232
ROTARY INTERNAL COMBUSTION ENGINE
Filed Aug. 31, 1938  3 Sheets-Sheet 2

Spencer D. Reed
INVENTOR.

BY C.A. Snow & Co.
ATTORNEYS.

Sept. 17, 1940.　　　　S. DE W. REED　　　　2,215,232
ROTARY INTERNAL COMBUSTION ENGINE
Filed Aug. 31, 1938　　　3 Sheets-Sheet 3
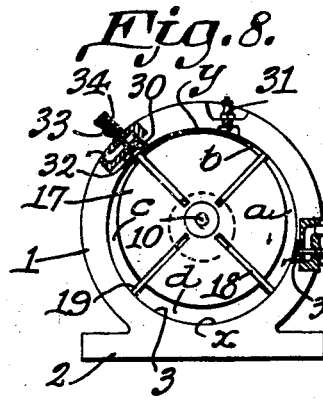
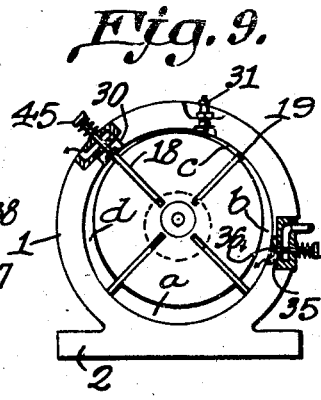
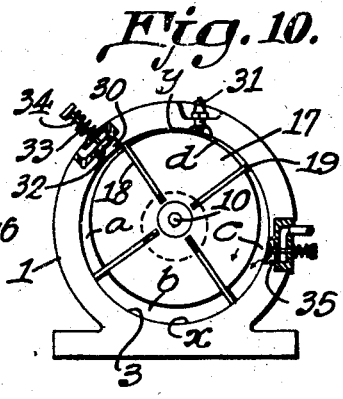
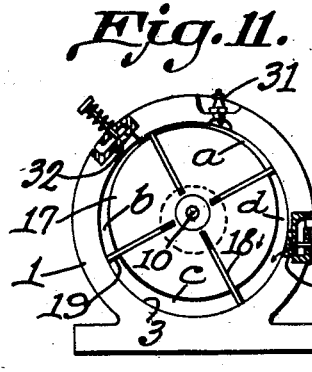
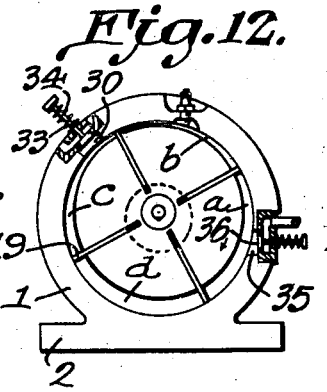
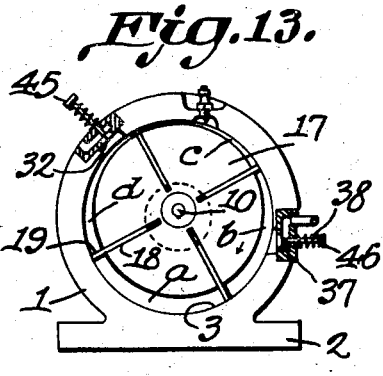
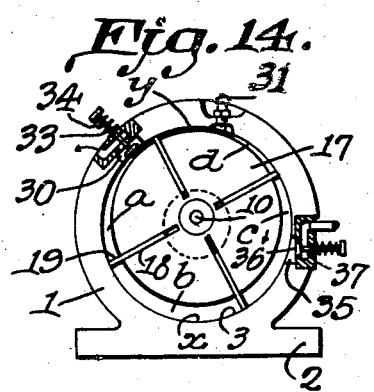
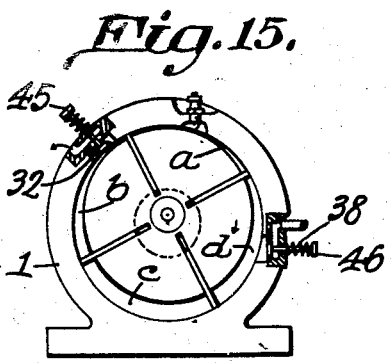
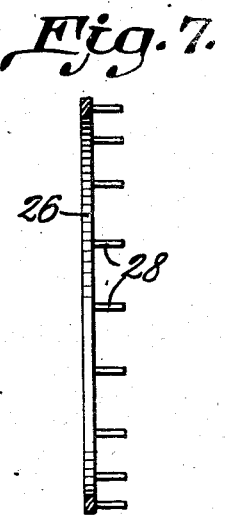
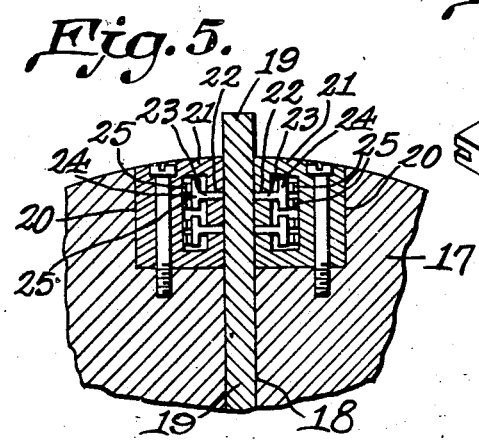
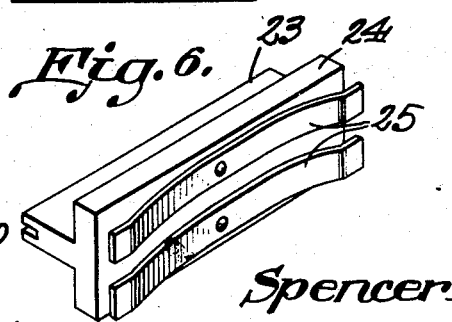
Spencer D. Reed
INVENTOR.
BY *[signature]*
ATTORNEYS.

Patented Sept. 17, 1940

2,215,232

UNITED STATES PATENT OFFICE 2,215,232

ROTARY INTERNAL COMBUSTION ENGINE

Spencer De Witt Reed, Endicott, N. Y.

Application August 31, 1938, Serial No. 227,805

2 Claims. (Cl. 123—16)

This invention relates to a rotary internal combustion engine of the four cycle type, one of the objects being to provide an engine adapted for use on motor vehicles, aircraft, boats, for industrial purposes, etc., it being possible to attain more efficient results than ordinarily due to the reduction of reciprocation and lost motion to the minimum.

A further object is to provide an engine of this type which is simple and compact in construction, formed of few parts, and will not readily get out of order.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

In the accompanying drawings the preferred form of the invention has been shown.

In said drawings:

Figure 1 is a vertical section through the engine taken on the line 1—1 Figure 2, parts being shown in elevation.

Figure 3 is a section on line 3—3 Figure 2.

Figure 5 is an enlarged section through a portion of one of the vanes and its rotor showing opposed sealing elements cooperating with the vanes, said elements being in end elevation.

Figure 6 is a perspective view of one of the contact members of said sealing elements.

Figure 7 is a side elevation of one of the sealing rings.

Figure 8 is a view more or less in diagram showing the engine at the beginning of its intake cycle and while products of combustion are being exhausted.

Figure 9 is a similar view showing the positions of the parts during the completion of the exhaust cycle immediately prior to the completion of the intake cycle.

Figure 10 is a similar view illustrating the beginning of the compression cycle.

Figure 11 shows the positions of the parts during the beginning of the firing cycle.

Figure 12 is a view similar to Figures 8 to 11, showing one stage of the advance of the engine from the beginning of the firing cycle toward the commencement of the exhaust cycle.

Figure 13 is a similar view showing the next succeeding stage in the advance of the engine from the beginning of the firing cycle to the beginning of the exhaust cycle.

Figures 14 is a view similar to Figure 13 showing the parts at the beginning of the exhaust cycle.

Figure 15 is a view similar to Figure 14 showing the engine in position next preceding to that illustrated in Figure 8.

Figure 2:
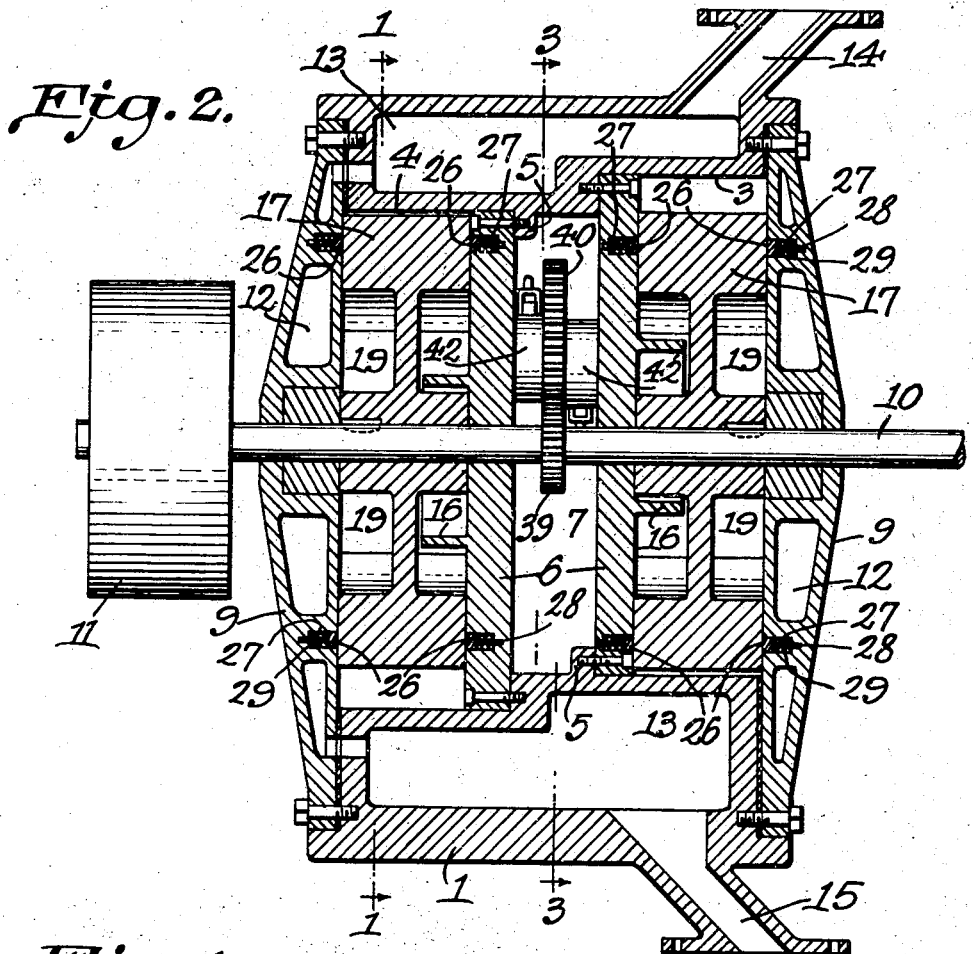
Figure 2 is a section on the line 2—2 Figure 1.
Figure 4:
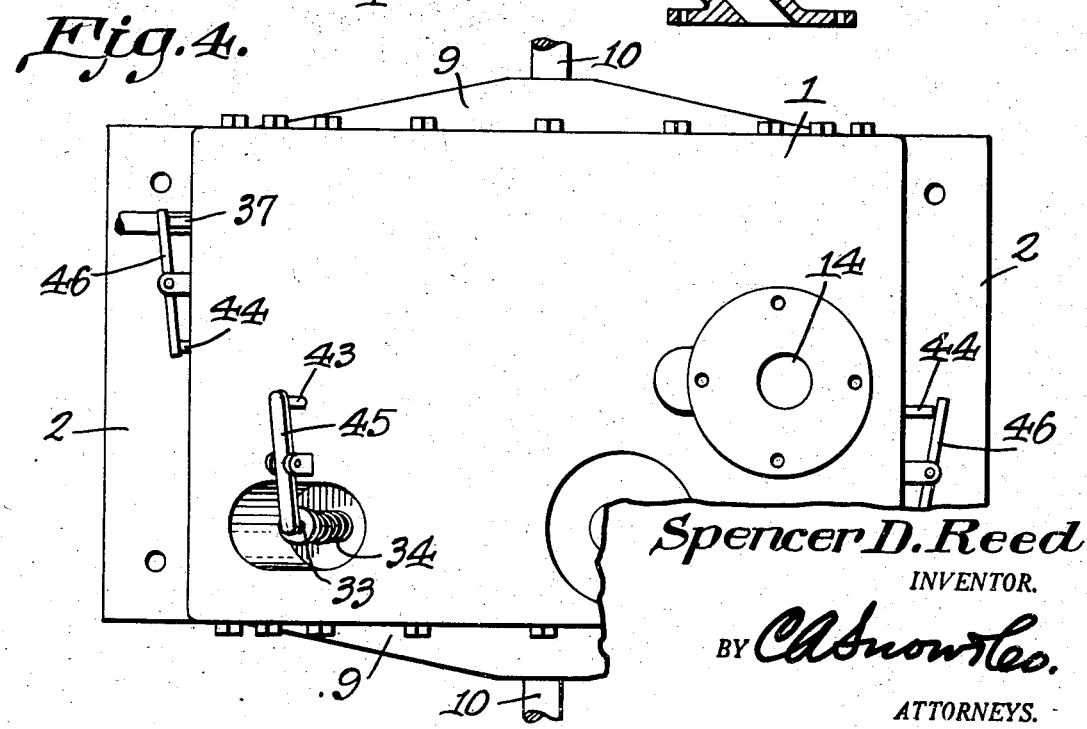
Figure 4 is a plan view.

Referring to the figures by characters of reference 1 designates an engine block which can be mounted on an integral base 2 or otherwise supported. This block has cylinder bores 3 and 4 extending thereinto from opposite ends respectively, the two bores being out of axial alinement, due to the fact that one bore is offset radially diametrically opposite to the other bore. Each bore is provided with an annular shoulder 5 at its inner end and both shoulders are detachably engaged by inner heads 6 forming a gear chamber 7 therebetween.

Heads 9 close the outer ends of the respective bores and these heads as well as the heads 6 provide bearings for the engine shaft 10 which can be provided with a fly-wheel 11 if desired. Both heads 9 have chambers 12 therein in communication with water jackets 13 in block 1 so that water or any other cooling medium admitted to the water jacket 13 through an inlet port 14 is free to circulate within the wall of block 1 and within heads 9 and then pass outwardly through port 15.

Each of the heads 6 has a circular guide 16 extending laterally therefrom in the direction of the adjacent head 9 and these guides are concentric with the walls of the respective bores in which they are located.

The two bores 3 and 4 are eccentrically disposed relative to shaft 10 and secured to the shaft within each of the bores is a rotor 17 the side faces of which fit snugly against the inner faces of the adjacent heads 6 and 9 while the periphery of each rotor cooperates with the peripheral wall of its bore or cylinder to provide an annular clearance which, as shown particularly in Figure 1, is gradually reduced in size in opposite directions from a point of maximum area to a point diametrically opposed where a very slight clearance is left between the rotor and the wall of its cylinder. These points have been indicated at $x$ and $y$ respectively.

Each rotor is formed with preferably four equally spaced radial slots 18 extending transversely thereof inwardly from the periphery and in each slot is slidably mounted a vane 19 the inner end of which rides on the circular guide 16 associated with said rotor while the outer end thus is maintained in contact with the peripheral wall of the cylinder or bore. Thus while the rotor is maintained at all times eccentric to the cylinder, the outer ends of the vanes are maintained constantly in contact with the wall of the cylinder.

Recesses 20 are formed in the periphery of each rotor at opposite sides of each vane and in each of these recesses is secured a box 21 each having slots 22 in one face. These slotted faces of the boxes contact with opposed faces of the vane located between the boxes and slidably mounted in each slot is a sealing fin 23 extending from a plate 24. Springs 25 are secured to one face of this plate and bear against one wall of block 21 so that they thus act to hold the fins 23 normally pressed outwardly into contact with the adjacent faces of the vane 19. By providing a pair of these spring-pressed fins 23 at each side of the vane, leakage of pressure along the vane is prevented.

Leakage of pressure at the sides of the rotor is overcome by the use of sealing rings 26 seated in circular grooves 27 in the heads 6 and 9 and bearing adjacent faces of the rotors. Each of these rings is provided with pins 28 on which springs 29 are mounted so as to thrust constantly against the rings and hold them pressed tightly against the faces of the rotors. The pins extend into openings of the heads, thereby preventing rotary movement of the rings with respect to the rotors. These rings are concentric with the shaft 10 but eccentric to the bores 3 and 4.

The throat portion y of the clearance between each rotor and its cylinder is located between an exhaust port 30 and an ignition device such as a spark plug 31, it being understood that the distance between the exhaust portion and the spark plug is less than the distance between any two adjoining vanes 19 at their outer ends. The exhaust port 30 is normally closed by means of a valve 32 the stem 33 of which has a spring 34 for maintaining the valve normally closed.

Each cylinder is also provided with an intake port 35 located substantially ninety degrees in a clockwise direction beyond the spark plug 31, as shown in Figure 1. This port 35 is adapted to be closed by a valve 36 the stem 37 of which has a spring 38 whereby the valve is maintained normally closed. A down draft carburetor C is connected to the intake port 35.

Secured on the shaft 10 and within chamber 7 is a gear 39 constantly in mesh with gears 40 and 41 one of which is provided for each of the cylinders of the engine. Each gear has a cam 42 and 42' respectively rotatable therewith and these cams respectively actuate rods 43 and 44 in succession. Rod 43 is operatively connected to a lever 45 which, in turn, is adapted to exert pressure against the valve stem 33. Rod 44 is operatively connected to a lever 46 adapted to exert thrust against the valve stem 37. It is to be understood that the gears and cams are to be so timed that the operations hereinafter explained will occur in proper succession, the gear ratio to be 2:1.

As the action taking place in both cylinders is the same, the successive operations in one cylinder will now be explained.

As shown particularly in Figures 1 and 8 to 15 inclusive, the vanes 19 cooperate with the wall of the cylinder to divide the clearance space into four separate chambers which have been designated at a, b, c and d respectively. As the chamber a reaches and passes the intake port 35 it will gradually increase in volume, thereby setting up a partial vacuum which will result in fuel being sucked into said chamber as the rotor travels in a clockwise direction as indicated by arrows in the drawings. See Figure 8. As the next succeeding chamber b reaches the intake port, it too will have been enlarged so as to set up a suction of fuel into the chamber. This action will be followed successively by chambers c and d. As the chamber a reaches the position indicated in Figure 9 and the rotor continues to move, said chamber will become gradually reduced in size as it moves to position shown in Figure 10. Consequently the fuel mixture contained within chamber a will be gradually compressed and this compression will continue as the advancing end of chamber a approaches the throat y. This fuel mixture will be placed under a high degree of compression as it is forced through the throat during the further advance of chamber a and at the time the back end of chamber a passes the exhaust port 30, which is of course closed during the foregoing operation, the compressed gas will flow past the ignition device 31. Thus the rotor will reach the position shown in Figure 11 at which time all of the chambers a, b, c, and d, will be filled with fuel. Before the advancing end of chamber a reaches the intake port 35 said port is closed automatically by the valve gearing and immediately thereafter the charge in chamber a while located as in Figure 11, is exploded. As the vane forming the advancing wall of chamber a presents an impact-receiving surface of greater area than the throat y and that portion of the vane exposed adjacent thereto, an impulse in a clockwise direction will be imparted to the rotor as a result of the explosion. This will bring chamber b into firing position as shown in Figure 12 while chamber a with the burned gas therein, will continue to travel in a clockwise direction, said chamber increasing in transverse area until it reaches the position shown in Figure 13 following which the spent gases will be slightly contracted substantially to the condition present when chamber a was in the position shown in Figure 12. Successive explosions take place in the four chambers until finally chamber a is brought to the position as shown in Figure 14 where it is in communication with the exhaust port 30. The valve in this port has been opened automatically by this time and is kept open as the four chambers are brought successively into communication therewith so that the spent gases are thus free to escape. Immediately following the exhaustion of burned gases from chamber a, as in Figure 14, said chamber moves to the position shown in Figure 15 and then it commences to create a part vacuum as heretofore explained so that when it reaches the position shown in Figure 8 the cycle will be completed and the chamber is ready once more to receive the explosive mixture.

From the foregoing it will be noted that during one rotation of shaft 10, four charges of explosive mixture will be taken into one cylinder and thereafter during another rotation, these charges will be successively compressed, fired and exhausted. While an engine will function with only a single cylinder and rotor, it is possible to produce a balanced effect by having two cylinders and two rotors oppositely offset as described and shown so that while one cylinder is being charged, the firing and exhausting of gases will be taking place in the other cylinder.

The valves of each cylinder operate automatically at the proper times, the intake valve remaining open until the four chambers have been brought successively into communication therewith after which it closes and remains closed until said chambers are again in position to receive an explosive mixture. The exhaust valve remains closed while the chambers are receiving the explosive mixture and until the first chamber in which an explosion has occurred reaches port 30 at which time said exhaust valve opens and stays open until the four chambers have exhausted thereinto.

What is claimed is:

1. A rotary internal combustion engine including a cylinder, a rotor eccentrically located therein and cooperating therewith to provide an annular space therebetween gradually increasing in transverse area in opposite directions from a restricted throat or passage to a diametrically opposed point of maximum area, radial vanes slidable in the rotor and dividing said space into separate chambers variable in volume during the operation of the rotor, intake and exhaust ports, means controlled by the operation of the rotor for maintaining the intake port open during one complete rotation of the rotor to charge all of the chambers successively with fuel as they leave the throat portion of the annular space, thereby to provide an engine all chambers of which are filled with fuel during one complete rotation of the rotor, said means operating to maintain the said port closed during the next rotation of the motor, means under the control of the rotor for maintaining the exhaust port closed until the last of the fuel charged chambers has passed said port, said rotor, vanes and cylinder cooperating to compress the charges of fuel successively within all of the chambers and force said charges successively past the throat, means for firing the charges successively during the second complete rotation of the rotor as their chambers leave the throat thereby to impart a propelling impulse against the advancing vane of each chamber successively, and means for maintaining the exhaust port open during that period when the chambers containing burned gases move successively into communication with said port during said second rotation, said chambers moving successively from the exhaust port to the throat to create a vacuum in each chamber after leaving the throat and preparatory to being recharged with fuel.

2. A rotary internal combustion engine including non-aligning cylinders offset in opposite directions respectively, a shaft extending through the cylinders and eccentric relative thereto, a rotor concentric with and secured to the shaft in each cylinder, each cylinder, its rotor and cooperating parts comprising a complete unit disposed oppositely to the unit formed by the other cylinder, its rotor and associated parts, the rotor of each unit cooperating with its cylinder to provide an annular space therebetween gradually increasing in transverse area in opposite directions from a restricted throat or passage to a diametrically opposed point of maximum area, each unit including radial vanes slidable in the rotor and dividing said space into separate chambers variable in volume during the operation of the rotor, intake and exhaust ports, means controlled by the operation of the rotor for maintaining the intake port open during one complete rotation of the rotor to charge all of the chambers successively with fuel as they leave the throat portion of the annular space, thereby to provide an engine all chambers of which are filled with fuel during one complete rotation of the rotor, said means operating to maintain the said port closed during the next rotation of the motor, means under the control of the rotor for maintaining the exhaust port closed until the last of the fuel charged chambers has passed said port, said rotor, vanes and cylinder cooperating to compress the charges of fuel successively within all of the chambers and force said charges successively past the throat, means for firing the charges successively during the second complete rotation of the rotor as their chambers leave the throat thereby to impart a propelling impulse against the advancing vane of each chamber successively, and means for maintaining the exhaust port open during that period when the chambers containing burned gases move successively into communication with said port during said second rotation, said chambers moving successively from the exhaust port to the throat to create a vacuum in each chamber after leaving the throat and preparatory to being recharged with fuel.

SPENCER DE WITT REED.